(12) United States Patent
Sung et al.

(10) Patent No.: US 10,446,880 B2
(45) Date of Patent: Oct. 15, 2019

(54) BATTERY STACK BALANCING APPARATUS

(71) Applicant: LG CHEM, LTD., Seoul (KR)

(72) Inventors: Chang-Hyun Sung, Daejeon (KR); Sang-Hoon Lee, Daejeon (KR)

(73) Assignee: LG CHEM., LTD., Seoul (KR)

( * ) Notice: Subject to any disclaimer, the term of this patent is extended or adjusted under 35 U.S.C. 154(b) by 171 days.

(21) Appl. No.: 15/556,200

(22) PCT Filed: Jul. 13, 2016

(86) PCT No.: PCT/KR2016/007625
§ 371 (c)(1),
(2) Date: Sep. 6, 2017

(87) PCT Pub. No.: WO2017/014487
PCT Pub. Date: Jan. 26, 2017

(65) Prior Publication Data
US 2018/0040922 A1    Feb. 8, 2018

(30) Foreign Application Priority Data

Jul. 23, 2015   (KR) .................. 10-2015-0104539

(51) Int. Cl.
*H01M 10/00* (2006.01)
*H01M 10/42* (2006.01)
(Continued)

(52) U.S. Cl.
CPC ......... *H01M 10/4257* (2013.01); *B60L 58/22* (2019.02); *H01M 2/10* (2013.01);
(Continued)

(58) Field of Classification Search
CPC .... B60L 58/22; B60L 2240/547; H01M 2/10; H01M 10/42; H01M 10/44; H01M 2/206; H01M 10/4257
See application file for complete search history.

(56) References Cited

U.S. PATENT DOCUMENTS

| 6,140,800 A | 10/2000 | Peterson |
| 2012/0007558 A1 | 1/2012 | Pigott |

(Continued)

FOREIGN PATENT DOCUMENTS

| JP | 11-98698 A | 4/1999 |
| JP | 2013-13291 A | 1/2013 |

(Continued)

OTHER PUBLICATIONS

International Search Report, issued in PCT/KR2016/007625, dated Oct. 21, 2016.

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

Disclosed is a balancing apparatus capable of performing balancing without wasting power and of rapidly transmitting power. A battery stack balancing apparatus for balancing a battery stack including a plurality of battery modules connected to each other in series includes a series resonant circuit including a first capacitor and a first inductor connected to the first capacitor in series, a polarity change circuit including a second inductor and a polarity change switch connected to the second inductor in series so as to be selectively turned on or off, and connected to the first capacitor in parallel, a plurality of transmission lines having ends, respectively, electrically connected to a plurality of nodes provided at a low-potential end of the battery stack, at a high-potential end of the battery stack, and between the plurality of battery modules connected to each other in series, and other ends connected to the series resonant circuit, a plurality of transmission switches provided on the plurality of transmission lines so as to be selectively turned on or off, and a control unit configured to control the (Continued)

plurality of transmission switches and the polarity change switch.

19 Claims, 16 Drawing Sheets

(51) Int. Cl.
*H01M 2/10* (2006.01)
*H01M 10/44* (2006.01)
*H01M 2/20* (2006.01)
*H02J 7/00* (2006.01)
*B60L 58/22* (2019.01)

(52) U.S. Cl.
CPC ........... *H01M 2/206* (2013.01); *H01M 10/42* (2013.01); *H01M 10/4264* (2013.01); *H01M 10/44* (2013.01); *H02J 7/0014* (2013.01); *B60L 2240/547* (2013.01); *H01M 2010/4271* (2013.01); *H01M 2220/20* (2013.01); *Y02T 10/7005* (2013.01); *Y02T 10/7055* (2013.01); *Y02T 10/7061* (2013.01)

(56) References Cited

U.S. PATENT DOCUMENTS

| | | |
|---|---|---|
| 2013/0093248 A1 | 4/2013 | Liu |
| 2014/0062383 A1 | 3/2014 | Yun et al. |
| 2014/0239878 A1 | 8/2014 | Yun et al. |
| 2014/0254223 A1* | 9/2014 | Limpaecher ........ H02M 7/4826 363/126 |
| 2014/0312828 A1* | 10/2014 | Vo ..................... H01M 10/4257 320/103 |
| 2014/0340022 A1 | 11/2014 | Kang et al. |
| 2015/0236534 A1* | 8/2015 | Kim ..................... H02J 7/0016 320/118 |
| 2015/0340886 A1 | 11/2015 | Sung et al. |

FOREIGN PATENT DOCUMENTS

| | | |
|---|---|---|
| KR | 10-2014-0029876 A | 3/2014 |
| KR | 10-2014-0093404 A | 7/2014 |
| KR | 10-2014-0106982 A | 9/2014 |
| WO | WO 2010/079061 A1 | 7/2010 |

* cited by examiner

BATTERY STACK BALANCING APPARATUS

TECHNICAL FIELD

The present disclosure relates to a battery balancing technology, and more particularly, to an apparatus for balancing a battery stack including two or more battery modules, by using a resonant circuit.

The present application claims priority to Korean Patent Application No. 10-2015-0104539 filed on Jul. 23, 2015 in the Republic of Korea, the disclosure of which is incorporated herein by reference.

BACKGROUND ART

Secondary batteries having electrical characteristics such as easy applicability to products and high energy density are broadly used not only in portable devices but also in electric vehicles (EVs) or hybrid vehicles (HVs) which are driven using electric power sources.

The secondary batteries may greatly reduce use of fossil fuel, do not produce any by-product after using energy, and thus are regarded as a new environment-friendly energy source capable of increasing energy efficiency.

A battery pack used in an electric vehicle or the like typically includes a plurality of battery cells connected to each other in series and/or in parallel. The battery cells include a positive current collector, a negative current collector, a separator, an active material, an electrolyte, etc., and are rechargeable due to electrochemical reaction among the components thereof.

The battery pack generally includes a battery management system (BMS) configured to control power supply, measure electrical characteristic values such as a current and a voltage, control charge/discharge, control voltage equalization, estimate the state of charge (SOC), estimate the state of health (SOH), etc.

The battery cells included in the battery pack may have deviation in performance due to various reasons. The deviation in performance of the battery cells causes voltage imbalance among the battery cells.

When the battery pack having voltage imbalance is used, the performance of the battery pack depends on a degraded battery cell and thus is reduced overall. In addition, since degradation of the degraded battery cell is accelerated as time passes, when the degraded battery cell is neglected, the life of the battery pack is rapidly reduced.

As conventional technologies capable of solving the above problems, passive balancing has been performed by selectively connecting a resistor to two ends of a battery cell and discharging the battery cell, and active balancing has been performed by transmitting power of a battery cell having a high voltage via a capacitor to a battery cell having a low voltage.

However, the conventional passive balancing technology consumes power by using the resistor for balancing and thus wastes power, and the conventional active balancing technology using the capacitor should repeatedly perform switching operations to generate a voltage difference between the battery cell and the capacitor and thus requires much time for balancing.

DISCLOSURE

Technical Problem

The present disclosure is designed to solve the problems of the related art, and therefore the present disclosure is directed to providing a balancing apparatus capable of performing balancing without wasting power and of rapidly transmitting power.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery stack balancing apparatus for balancing a battery stack including a plurality of battery modules connected to each other in series, the apparatus including a series resonant circuit including a first capacitor and a first inductor connected to the first capacitor in series, a polarity change circuit including a second inductor and a polarity change switch connected to the second inductor in series so as to be selectively turned on or off, and connected to the first capacitor in parallel, a plurality of transmission lines having ends, respectively, electrically connected to a plurality of nodes provided at a low-potential end of the battery stack, at a high-potential end of the battery stack, and between the plurality of battery modules connected to each other in series, and other ends connected to the series resonant circuit, a plurality of transmission switches provided on the plurality of transmission lines so as to be selectively turned on or off, and a control unit configured to control the plurality of transmission switches and the polarity change switch.

The other ends of the plurality of transmission lines may be alternately connected to an end and another end of the series resonance circuit.

The control unit may control the plurality of transmission switches in such a manner that zero current switching or zero voltage switching is performed in accordance with a half period of a resonance period of the series resonant circuit.

The control unit may control the polarity change switch in such a manner that zero current switching or zero voltage switching is performed in accordance with a half period of a resonance period of a parallel resonant circuit formed by the first capacitor and the second inductor when the polarity change switch is turned on.

The control unit may control the polarity change switch and the plurality of transmission switches by comparing a polarity of a voltage of at least one battery module for supplying power to the series resonant circuit, to a polarity of a voltage charged in the first capacitor.

The control unit may control the polarity change switch to be turned on and control all of the plurality of transmission switches to be turned off, when the polarity of the voltage of the at least one battery module for supplying power to the series resonant circuit equals the polarity of the voltage charged in the first capacitor.

The control unit may control the polarity change switch and the plurality of transmission switches by comparing a polarity of a voltage of at least one battery module for receiving power supplied from the series resonant circuit, to a polarity of a voltage charged in the first capacitor.

The control unit may control the polarity change switch to be turned off, control two transmission switches connected to two ends of the at least one battery module for receiving power supplied from the series resonant circuit, to be turned on, and control transmission switches other than the two transmission switches to be turned off, when the polarity of the voltage of the at least one battery module for receiving power supplied from the series resonant circuit equals the polarity of the voltage charged in the first capacitor.

The control unit may control the polarity change switch to be turned on and control all of the plurality of transmission switches to be turned off, when the polarity of the voltage of the at least one battery module for receiving power supplied from the series resonant circuit differs from the polarity of the voltage charged in the first capacitor.

Each of the battery modules may be a unit battery cell or an assembly of two or more battery cells.

In another aspect of the present disclosure, there is also provided a battery pack including the above-described battery stack balancing apparatus.

In another aspect of the present disclosure, there is also provided an electric vehicle including the above-described battery stack balancing apparatus.

Advantageous Effects

According to the present disclosure, since balancing is performed using a series resonant circuit and zero voltage or zero current switching is performed at a half period of a resonance period of the series resonant circuit, a voltage difference between battery cells and the resonant circuit may be maximized and thus balancing may be efficiently and rapidly performed.

Furthermore, according to the present disclosure, since a polarity change circuit connected to a first capacitor of the series resonant circuit in parallel is used, the number of transmission lines and transmission switches may be reduced.

In addition, according to the present disclosure, a parallel resonant circuit may be formed by the first capacitor and a second inductor by turning on a polarity change switch of the polarity change circuit, and balancing may be more efficiently performed due to resonance of the parallel resonant circuit.

The present disclosure may also have a variety of other effects, and these and other effects of the present disclosure may be understood from the following detailed description and will become more fully apparent from the exemplary embodiments of the present disclosure.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In the following description of the present disclosure, a detailed description of known functions and configurations incorporated herein will be omitted when it may make the subject matter of the present disclosure unclear.

Throughout the specification, it will be understood that the terms "comprises" and/or "comprising" specify the presence of stated components but do not preclude the presence or addition of one or more other components, unless the context clearly indicates otherwise. A term such as "control unit" used herein refers to a unit of processing at least one function or operation, which may be implemented as hardware, software, or a combination of hardware and software.

It will be further understood that when a component is referred to as being "connected to" another component, it can be directly connected to the other component, or an intervening component may also be present.

Figure 1:
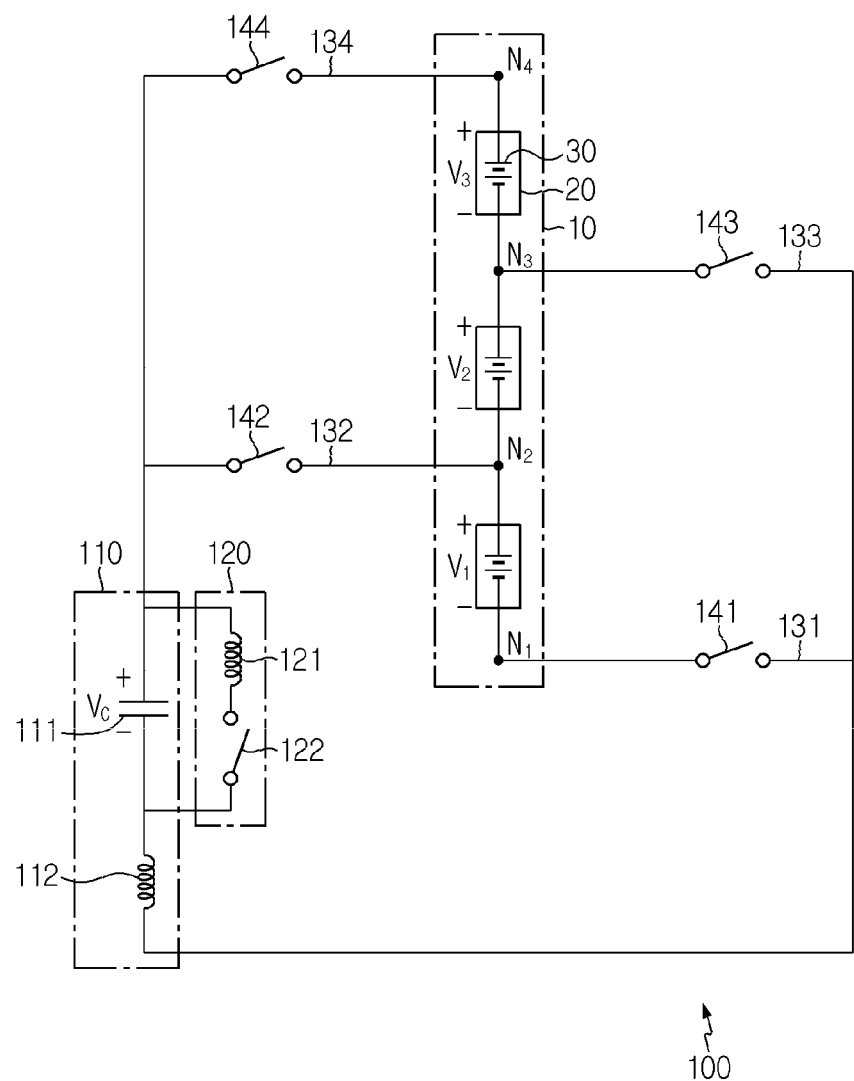
FIG. 1 is a circuit diagram showing that a battery stack balancing apparatus according to an embodiment of the present disclosure is connected to a battery stack.

FIG. 1 is a circuit diagram showing that a battery stack balancing apparatus 100 according to an embodiment of the present disclosure is connected to a battery stack 10.

Referring to FIG. 1, the battery stack 10 includes a plurality of battery modules 20. The battery stack 10 is an assembly of the battery modules 20. Herein, the battery modules 20 may be connected to each other in series. Although the embodiment of FIG. 1 shows three battery modules 20, the number of the battery modules 20 is not limited thereto.

The battery modules 20 include battery cells. Each battery module 20 is a unit battery cell 30 or an assembly of two or more battery cells 30. In this case, the battery cells 30 may be connected to each other in series, in parallel, or in series and in parallel. Although the embodiment of FIG. 1 shows that the battery module 20 includes two battery cells 30 connected to each other in series, the number and the connection type of the battery cells 30 are not limited thereto.

Referring back to FIG. 1, the battery stack balancing apparatus 100 includes a series resonant circuit 110, a polarity change circuit 120, a plurality of transmission lines 131, 132, 133, and 134, a plurality of transmission switches 141, 142, 143, and 144, and a control unit (not shown).

The series resonant circuit 110 may include a capacitor and an inductor connected to each other in series. In this specification, the capacitor included in the series resonant circuit 110 is referred to as a first capacitor 111, and the inductor included in the series resonant circuit 110 is referred to as a first inductor 112. An appropriate capacitance of the first capacitor 111 and an appropriate inductance of the first inductor 112 may be determined in consideration of power to be charged, a resonance period, etc.

The polarity change circuit 120 may be connected in parallel to the first capacitor 111. The polarity change circuit 120 includes an inductor and a switch. In this specification, the inductor included in the polarity change circuit 120 is referred to as a second inductor 121, and the switch included in the polarity change circuit 120 is referred to as a polarity change switch 122. The polarity change switch 122 may be selectively turned on or off based on a control signal of the control unit to be described below. The polarity change switch 122 may be implemented as one of a variety of switching devices. According to an embodiment, the polarity change switch 122 may be implemented as a metal-oxide-semiconductor field-effect transistor (MOSFET). The polarity change switch 122 may be connected in series to the second inductor 121. When the polarity change switch 122 is turned on, the second inductor 121 is connected in parallel to the first capacitor 111. That is, when the polarity change switch 122 is turned on, the second inductor 121 and the first capacitor 111 may configure a parallel resonant circuit. On the contrary, when the polarity change switch 122 is turned off, parallel connection between the second inductor 121 and the first capacitor 111 is released. An appropriate capacitance of the first capacitor 111 and an appropriate inductance of the second inductor 121 may be determined in consideration of a resonance period, etc. Desirably, the inductance of the second inductor 121 may be set to a smaller value than that of the inductance of the first inductor 112 to set a shorter resonance period for the parallel resonant circuit than the resonance period of the series resonant circuit 110.

The transmission lines 131, 132, 133, and 134 electrically connect a plurality of nodes N1, N2, N3, and N4 provided on the battery stack 10, to the series resonant circuit 110. Herein, the nodes N1, N2, N3, and N4 provided on the battery stack 10 refer to the two nodes N1 and N4 provided at two ends of the battery stack 10, and the nodes N2 and N3 provided among the battery modules 20. In other words, the nodes N1, N2, N3, and N4 provided on the battery stack 10 refer to the node N1 provided at a low-potential end of the battery stack 10, the node N4 provided at a high-potential end of the battery stack 10, and the nodes N2 and N3 each provided between two adjacent battery modules 20. Ends of the transmission lines 131, 132, 133, and 134 are electrically connected to the nodes N1, N2, N3, and N4. Other ends of the transmission lines 131, 132, 133, and 134 are electrically connected to the series resonant circuit 110. In other words, an end of any one transmission line is connected to any one node provided on the battery stack 10, and another end of the transmission line is connected to the series resonant circuit 110.

In this case, the other end of each transmission line is connected to an end or another end of the series resonant circuit 110. Accordingly, any one battery module 20 may be electrically connected to the series resonant circuit 110 through a transmission line connected to two ends of the battery module 20. Desirably, the other ends of the transmission lines 131, 132, 133, and 134 may be alternately connected to the end and the other end of the series resonant circuit 110. That is, as shown in FIG. 1, the other ends of the transmission lines 131, 132, 133, and 134 connected to the nodes N1, N2, N3, and N4 may be alternately connected to the end and the other end of the series resonant circuit 110 along a direction from a high-potential node to a low-potential node or in a direction from the low-potential node to the high-potential node.

At least one switch may be provided on each of the transmission lines 131, 132, 133, and 134. In this specification, the switches provided on the transmission lines 131, 132, 133, and 134 are referred to as the transmission switches 141, 142, 143, and 144, respectively.

That is, the transmission switches 141, 142, 143, and 144 may be provided on the plurality of the transmission lines 131, 132, 133, and 134. Each of the transmission switches 141, 142, 143, and 144 may be implemented as one of a variety of switching devices. According to an embodiment, the transmission switches 141, 142, 143, and 144 may be implemented as MOSFETs. The transmission switches 141, 142, 143, and 144 may be selectively turned on or off based on a control signal of the control unit to be described below. The transmission switches 141, 142, 143, and 144 are selectively turned on and off in such a manner that at least one battery module 20 is electrically connected to the series resonant circuit 110 through at least two transmission lines.

The control unit may control the polarity change switch 122 and the transmission switches 141, 142, 143, and 144. The control unit may be communication-connected to the polarity change switch 122 and the transmission switches 141, 142, 143, and 144 and may control a switching operation by transmitting a control signal thereto. According to an embodiment, the polarity change switch 122 and the transmission switches 141, 142, 143, and 144 may be implemented as MOSFETs, and the control unit may control the polarity change switch 122 and the transmission switches 141, 142, 143, and 144 by selectively applying a voltage to gate terminals of the MOSFETs.

A balancing operation of the battery stack balancing apparatus 100 according to an embodiment of the present disclosure will now be described with reference to FIG. 2, etc.

For convenience of explanation, the three battery modules 20 are referred to as a first battery module 21, a second battery module 22, and a third battery module 23. As shown in FIG. 2, voltages of the first to third battery modules 21, 22, and 23 are denoted by V1, V2, and V3, and all of V1, V2, and V3 have positive values. In addition, a voltage of the first capacitor 111 is denoted by Vc. Unlike V1, V2, and V3, the voltage Vc of the first capacitor 111 may have a negative value. The values of V1, V2, V3, and Vc are changed based on time.

A process of transmitting power stored in the first battery module 21, to the series resonant circuit 110 will now be described.

Figure 2:
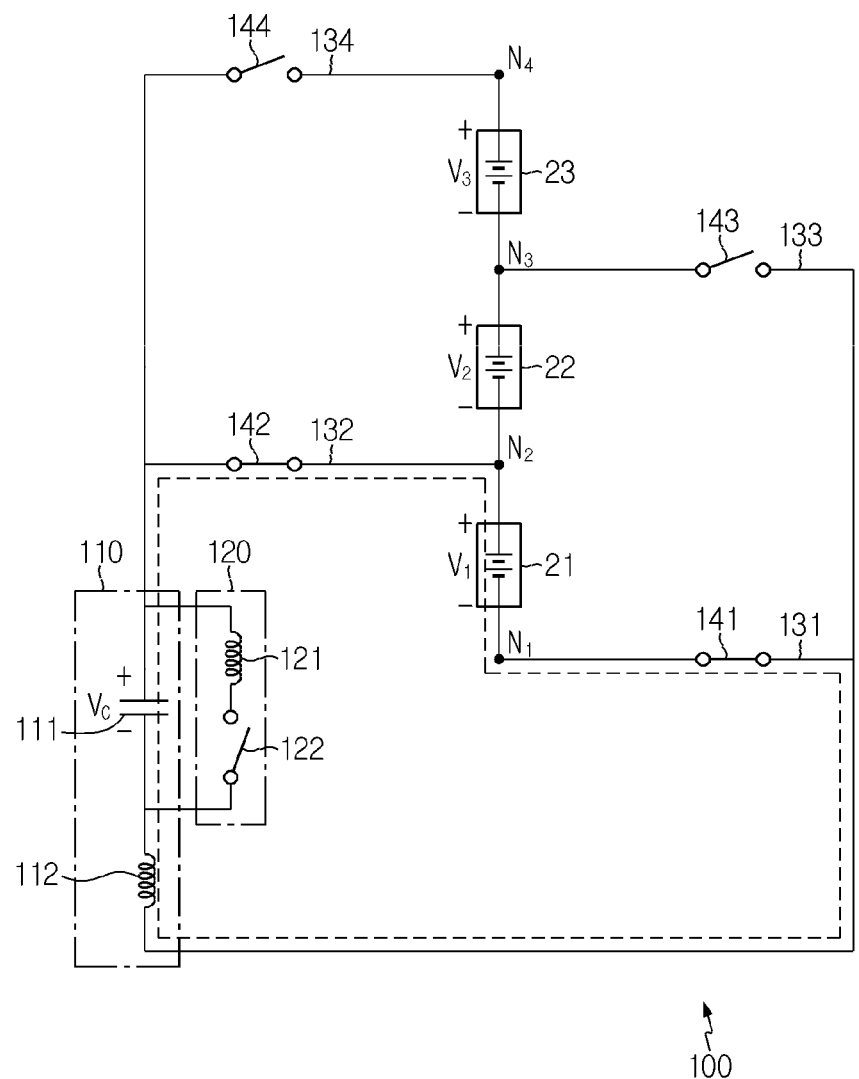
FIG. 2 is a circuit diagram showing that transmission switches adjacent to a first battery module are turned on at a time t0.
Figure 3:
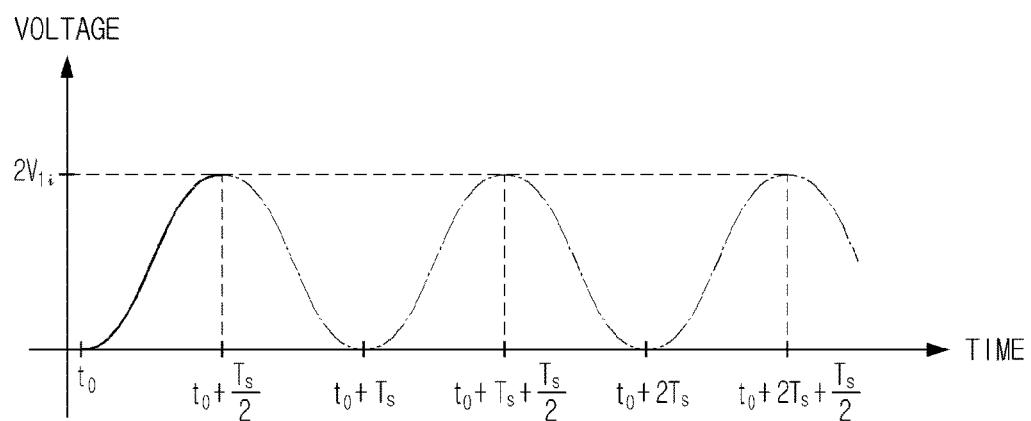
FIG. 3 is a graph showing a voltage of a first capacitor based on time.

FIG. 2 is a circuit diagram showing that the transmission switches 141 and 142 adjacent to the first battery module 21 are turned on at a time t0, and FIG. 3 is a graph showing the voltage of the first capacitor 111 based on time. In other words, FIG. 3 is a graph showing the voltage of the first capacitor 111 in a circuit formed by the control unit at the time t0.

Referring to FIG. 2, to transmit power stored in the first battery module 21, to the series resonant circuit 110, the control unit turns on the transmission switches 141 and 142 adjacent to the first battery module 21, turns off the other transmission switches 143 and 144, and turns off the polarity change switch 122 at the time t0. In other words, the control unit turns on the two transmission switches 141 and 142 connected to two ends of the first battery module 21, turns off the transmission switches 143 and 144 other than the two transmission switches 141 and 142, and turns off the polarity change switch 122.

As a result, a circuit illustrated in FIG. 2 is configured, and thus a closed path is generated by the first battery module 21, the transmission line 132, the series resonant circuit 110, and the transmission line 131. Power stored in the first battery module 21 is transmitted to the series resonant circuit 110 due to LC series resonance. Assuming that initial energy is not stored in a capacitor and an inductor at the arbitrary time t0 when the circuit illustrated in FIG. 2 is formed, the voltage of the first capacitor 111 after t0 is expressed as shown in the graph of FIG. 3. That is, the voltage of the first capacitor 111 in the series resonant circuit 110 in which a capacitor, an inductor, and a voltage source are connected to each other in series oscillates based on a resonance period as shown in FIG. 3. In this case, the voltage charged in the first capacitor 111 has the maximum value at half periods of resonance periods of the series resonant circuit 110. In other words, the voltage charged in the first capacitor 111 at times t0+Ts/2, t0+Ts+Ts/2, t0+2*Ts+Ts/2, t0+3*Ts+Ts/2, etc. has the maximum value 2*V1i which is twice the magnitude of an initial voltage V1i of the first battery module 21 serving as a voltage source. The initial voltage V1i of the first battery module 21 may be V1(t0) corresponding to a voltage of the first battery module 21 at the time t0.

The control unit may control the transmission switches 141, 142, 143, and 144 and the polarity change switch 122 in such a manner that zero voltage switching or zero current switching is performed in accordance with the half period of the resonance period of the series resonant circuit 110. Desirably, the control unit may perform zero voltage switching by controlling the transmission switches 141, 142, 143, and 144 and the polarity change switch 122 to be turned on or off at the earliest time t0+Ts/2 when the half period of the resonance period has elapsed from the time t0 when charging is started.

A process of transmitting power received by the series resonant circuit 110 from the first battery module 21, to the third battery module 23 will now be described.

Figure 4:
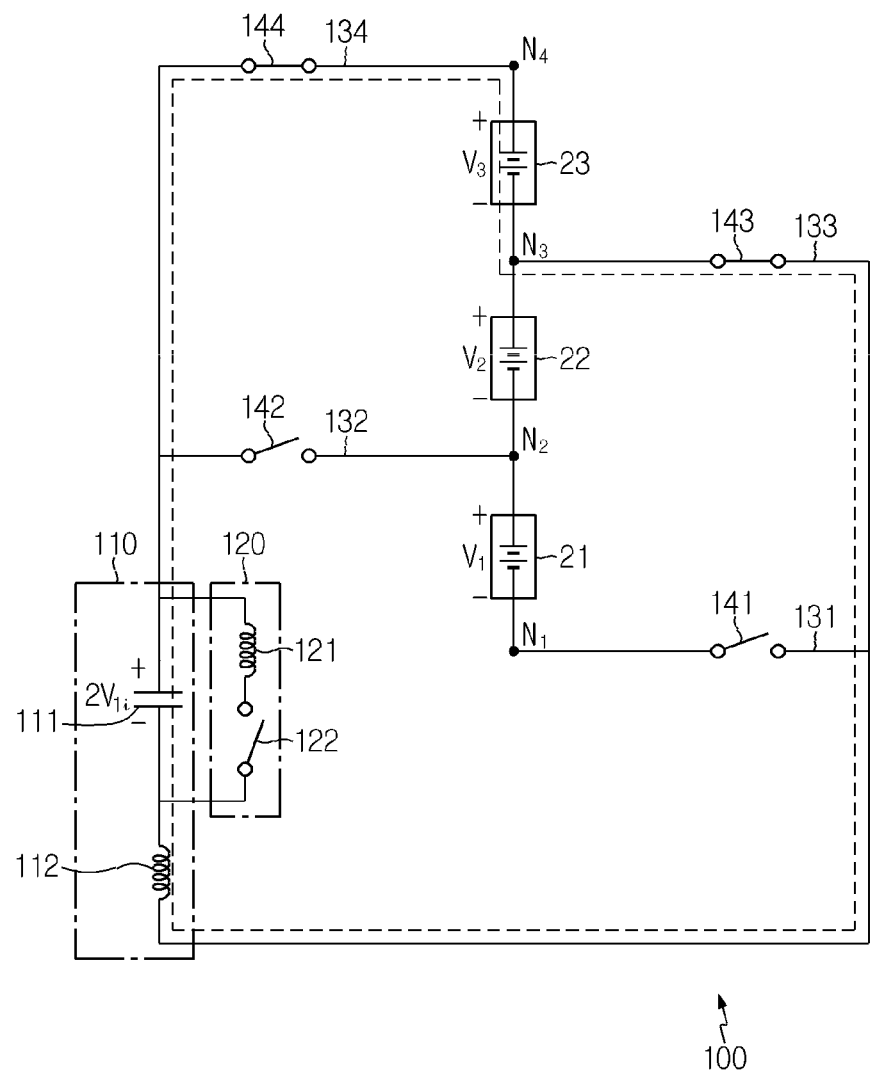
FIG. 4 is a circuit diagram showing that the transmission switches adjacent to the first battery module are turned off and transmission switches adjacent to a third battery module are turned on at a time when a half period of a resonance period of the series resonant circuit has elapsed from t0.
Figure 5:
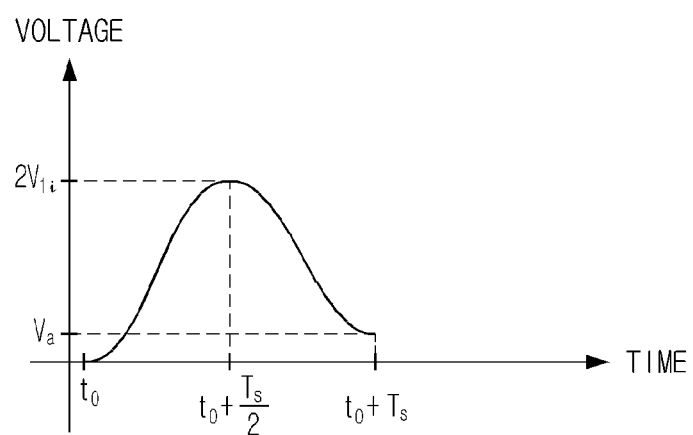
FIG. 5 is a graph showing the voltage of the first capacitor based on time.

FIG. 4 is a circuit diagram showing that the transmission switches 141 and 142 adjacent to the first battery module 21 are turned off and the transmission switches 143 and 144 adjacent to the third battery module 23 are turned on at the time t0+Ts/2 when the half period of the resonance period of the series resonant circuit 110 has elapsed from t0, and FIG. 5 is a graph showing the voltage of the first capacitor 111 based on time. In other words, FIG. 4 is a circuit diagram showing that the control unit performs zero voltage switching at the time t0+Ts/2 when the half period of the resonance period of the series resonant circuit 110 has elapsed after the circuit of FIG. 2 is formed, and FIG. 5 is a graph showing the voltage of the first capacitor 111 in the circuit changed due to switching control of the control unit, as time passes.

Referring back to FIG. 3, the voltage 2*V1i, which is twice the magnitude of the voltage of the first battery module 21, is charged in the first capacitor 111 of the series resonant circuit 110 at the time t0+Ts/2 when charging is completed. The polarity of a voltage of the third battery module 23 connected to the series resonant circuit 110 to receive power supplied therefrom equals the polarity of the voltage of the first capacitor 111. Specifically, assuming that the series resonant circuit 110 is electrically connected to the third battery module 23, the polarity of the voltage of the third battery module 23 equals the polarity of the voltage of the first capacitor 111. That is, assuming that the series resonant circuit 110 is electrically connected to the third battery module 23, a high-potential end of the third battery module 23 is connected to a high-potential end of the first capacitor 111, and a low-potential end of the third battery module 23 is connected to a low-potential end of the first capacitor 111 (see FIG. 1, etc.).

Since the polarity of the voltage of the third battery module 23 for receiving power supplied from the series resonant circuit 110 equals the polarity of the voltage of the first capacitor 111 and the voltage charged in the first capacitor 111 is about twice the magnitude of the voltage of the third battery module 23, although the series resonant circuit 110 is connected to the third battery module 23 without any change, power may be naturally transmitted from the series resonant circuit 110 to the third battery module 23.

Accordingly, the control unit controls power stored in the series resonant circuit 110 to be supplied to the third battery module 23 without changing the polarity of the voltage charged in the first capacitor 111. That is, as shown in FIG. 4, the control unit controls the two transmission switches 143 and 144 connected to two ends of the third battery module 23 to be turned on, controls the transmission switches 141 and 142 other than the two transmission switches 143 and 144 to be turned off, and controls the polarity change switch 122 to be turned off.

As a result, power stored in the series resonant circuit 110 may be transmitted to the third battery module 23. As shown in FIG. 3, the voltage of the first capacitor 111 at the time t0+Ts/2 is twice the magnitude of the initial voltage V1i of the first battery module 21, i.e., 2*V1i. 2*V1i serves as an initial voltage value of the first capacitor 111 in the circuit formed at the time t0+Ts/2 (see FIG. 4). Therefore, when power stored in the series resonant circuit 110 is transmitted to the third battery module 23, the voltage of the first capacitor 111 is changed as shown in FIG. 5. Power stored in the series resonant circuit 110 is transmitted to the third battery module 23 during a period from t0+Ts/2 to t0+Ts in FIG. 5.

A process of transmitting power received by the series resonant circuit 110 from the first battery module 21, to the second battery module 22 will now be described.

Figure 6:
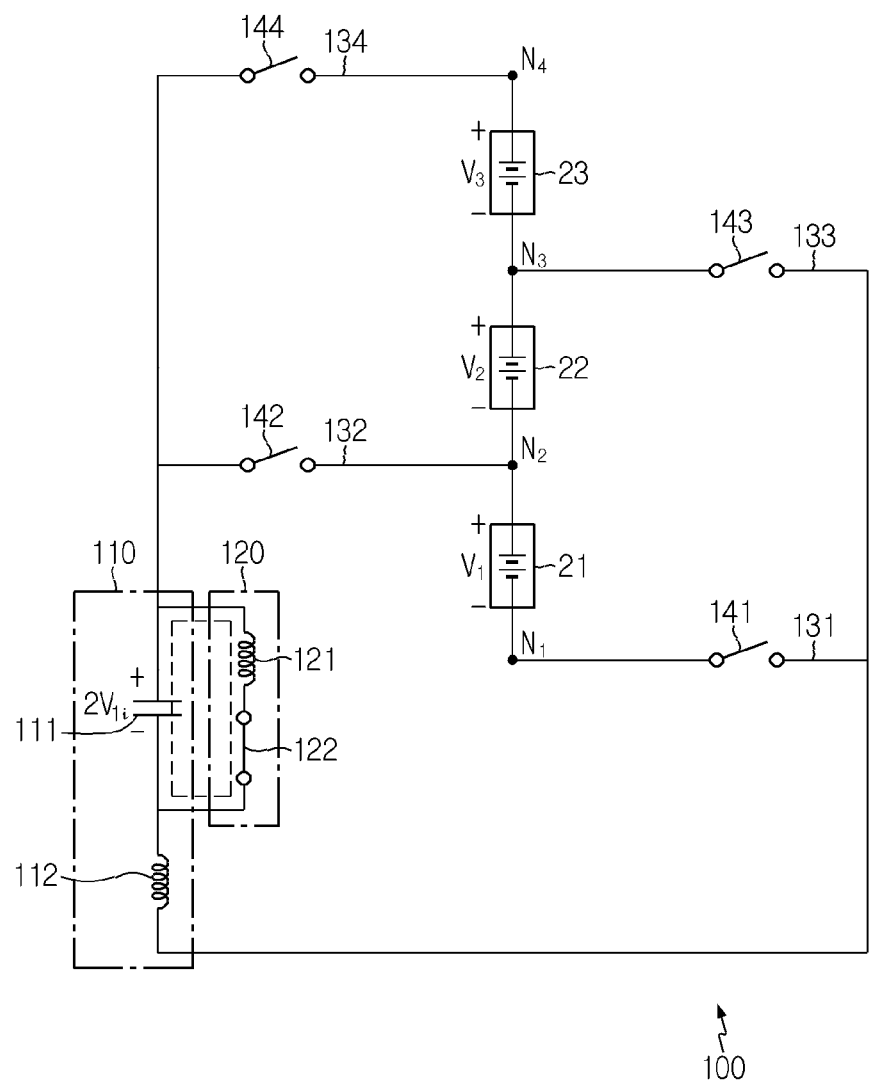
FIG. 6 is a circuit diagram showing that all transmission switches are turned off and a polarity change switch is turned on at the time when the half period of the resonance period of the series resonant circuit has elapsed from t0.
Figure 7:
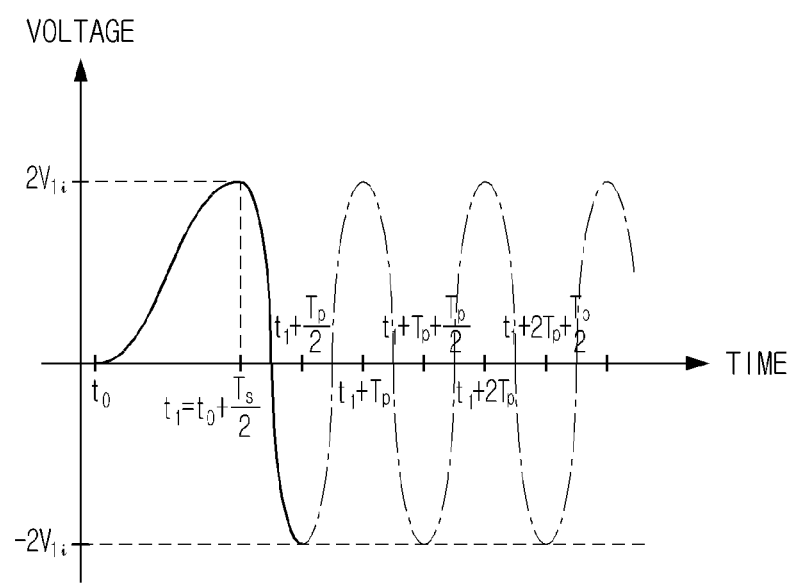
FIG. 7 is a graph showing the voltage of the first capacitor based on time.

FIG. 6 is a circuit diagram showing that all of the transmission switches 141, 142, 143, and 144 are turned off and the polarity change switch 122 is turned on at the time t0+Ts/2 when the half period of the resonance period of the series resonant circuit 110 has elapsed from t0, and FIG. 7 is a graph showing the voltage of the first capacitor 111 based on time. In other words, FIG. 6 is a circuit diagram showing that the control unit performs zero voltage switching at the time t0+Ts/2 when the half period of the resonance period of the series resonant circuit 110 has elapsed after the circuit of FIG. 2 is formed, and FIG. 7 is a graph showing the voltage of the first capacitor 111 in the circuit changed due to switching control of the control unit, as time passes.

Referring back to FIG. 3, the voltage 2*V1i, which is twice the magnitude of the initial voltage of the first battery module 21, is charged in the first capacitor 111 of the series resonant circuit 110 at the time t0+Ts/2 when charging is completed. The polarity of a voltage of the second battery module 22 connected to the series resonant circuit 110 to receive power supplied therefrom currently differs from the polarity of the voltage of the first capacitor 111. Specifically, assuming that the series resonant circuit 110 is electrically connected to the second battery module 22, the polarity of the voltage of the second battery module 22 differs from the polarity of the voltage of the first capacitor 111. That is, assuming that the series resonant circuit 110 is electrically connected to the second battery module 22, a high-potential end of the second battery module 22 is connected to a low-potential end of the first capacitor 111, and a low-potential end of the second battery module 22 is connected to a high-potential end of the first capacitor 111 (see FIG. 1, etc.). The reason why the polarity of the voltage of the first capacitor 111 differs from the polarity of the voltage of the second battery module 22 is because the transmission lines 131, 132, 133, and 134 are alternately connected to the series resonant circuit 110.

Since the polarity of the voltage of the second battery module 22 for receiving power supplied from the series resonant circuit 110 differs from the polarity of the voltage of the first capacitor 111, when the series resonant circuit 110 is connected to the second battery module 22 without any change, power may be transmitted from the second battery module 22 to the series resonant circuit 110 differently from the intention of a balance process. Therefore, the polarity of the voltage charged in the first capacitor 111 needs to be changed to transmit power stored in the series resonant circuit 110, to the second battery module 22.

Accordingly, instead of directly connecting the series resonant circuit 110 to the second battery module 22, the control unit controls the polarity of the voltage charged in the first capacitor 111 to be changed by using the polarity change circuit 120 and then controls the series resonant circuit 110 to be connected to the second battery module 22.

That is, as shown in FIG. 6, the control unit controls the polarity change switch 122 to be turned on, and controls all of the transmission switches 141, 142, 143, and 144 to be turned off. In other words, the control unit generates a resonant circuit using the first capacitor 111 and the second inductor 121 of the polarity change circuit 120 by turning on the polarity change switch 122 and turning off all of the transmission switches 141, 142, 143, and 144 at the time t0+Ts/2 when charging is completed. As shown in FIG. 3, the voltage of the first capacitor 111 at the time t0+Ts/2 is twice the magnitude of the initial voltage V1i of the first battery module 21, i.e., 2*V1i. 2*V1i serves as an initial voltage value of the first capacitor 111 in the circuit formed at the time t0+Ts/2 (see FIG. 6). That is, the voltage stored in the first capacitor 111 at a time when a parallel resonant circuit is formed by the first capacitor 111 and the second inductor 121 as shown in FIG. 6 is 2*V1i.

The parallel resonant circuit formed by the first capacitor 111 and the second inductor 121 repeatedly oscillates in a resonance period of the parallel resonant circuit. Since a power source such as a battery module is not connected to the parallel resonant circuit, the polarity of the voltage of the first capacitor 111 is changed as time passes as shown in FIG. 7. That is, the polarity of the voltage of the first capacitor 111 is changed at every half period of the resonance period.

Compared to the polarity of the voltage of the first capacitor 111 at a time t1=t0+Ts/2 when the parallel resonant circuit is formed, the first capacitor 111 has an opposite polarity in accordance with the half period of the resonance period of the parallel resonant circuit. In other words, the polarity of the voltage of the first capacitor 111 at times t1+Tp/2, t1+Tp+Tp/2, t1+2*Tp+Tp/2, t1+3*Tp+Tp/2, etc. is opposite to the polarity of the voltage of the first capacitor 111 at the time when the parallel resonant circuit is formed. Accordingly, the control unit may control the transmission switches 141, 142, 143, and 144 and the polarity change switch 122 in such a manner that zero voltage switching or zero current switching is performed in accordance with the half period of the resonance period of the parallel resonant circuit. Desirably, the control unit may perform zero voltage switching by controlling the transmission switches 141, 142, 143, and 144 and the polarity change switch 122 to transmit power stored in the series resonant circuit 110, to the second battery module 22 at the earliest time t1+Tp/2 when the half period of the resonance period has elapsed from the time t1 when the parallel resonant circuit is formed.

Figure 8:
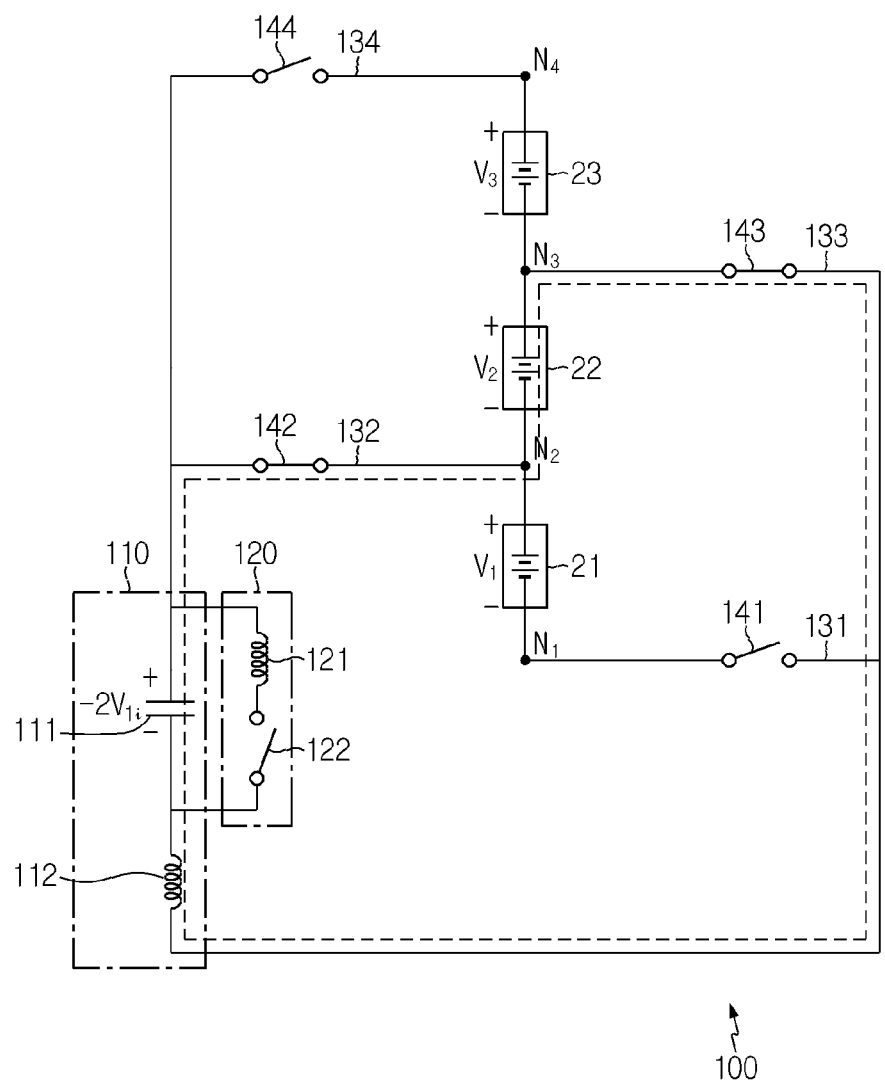
FIG. 8 is a circuit diagram showing that the polarity change switch is turned off and transmission switches adjacent to a second battery module are turned on at a time when a half period of a resonance period of the parallel resonant circuit has elapsed from t1.
Figure 9:
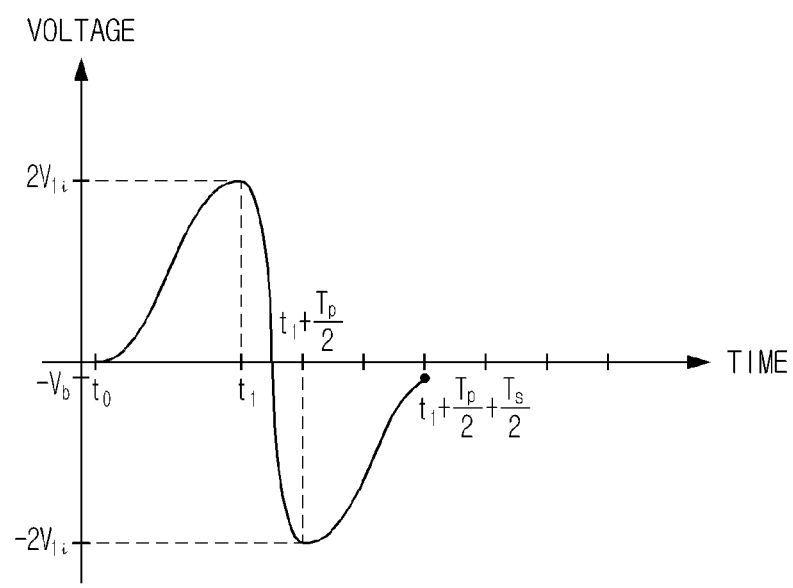
FIG. 9 is a graph showing the voltage of the first capacitor based on time.

FIG. 8 is a circuit diagram showing that the polarity change switch 122 is turned off and the transmission switches 142 and 143 adjacent to the second battery module 22 are turned on at the time t1+Tp/2 when the half period of the resonance period of the parallel resonant circuit has elapsed from t1, and FIG. 9 is a graph showing the voltage of the first capacitor 111 based on time.

At the time t1+Tp/2 when the half period of the resonance period of the parallel resonant circuit has elapsed from the time t1 when the parallel resonant circuit is formed, as shown in FIG. 8, the control unit controls the polarity change switch 122 to be turned off, controls the two transmission switches 142 and 143 connected to two ends of the second battery module 22 to be turned on, and controls the transmission switches 141 and 144 other than the two transmission switches 142 and 143 to be turned off in such a manner that the polarity of the voltage of the first capacitor 111 is changed before the series resonant circuit 110 is connected to the second battery module 22. Since the polarity of the voltage of the first capacitor 111 is changed, the voltage of the first capacitor 111 at the time t1+Tp/2 is −2*V1i. −2*V1i is a voltage value charged in the first capacitor 111 at the time when the series resonant circuit 110 is connected to the second battery module 22.

Since the polarity of the voltage of the first capacitor 111 is changed, power stored in the series resonant circuit 110 may be transmitted to the second battery module 22. That is, the series resonant circuit 110 may charge the second battery module 22. A change in the voltage of the first capacitor 111 when power stored in the series resonant circuit 110 is transmitted to the second battery module 22 is shown in FIG. 9. Specifically, power stored in the series resonant circuit 110 is transmitted to the second battery module 22 during a period from t1+Tp/2 to t1+Tp/2+Ts/2 in FIG. 9.

An operation for solving a problem in that the first capacitor 111 is not efficiently charged due to charges remaining in the first capacitor 111 in a balancing process will now be described.

Referring back to FIGS. 5 and 9, it is shown that the voltage of the first capacitor 111 at the time t0+Ts of FIG. 5 is not zero and the voltage of the first capacitor 111 at the time t1+Tp/2+Ts/2 of FIG. 9 is not zero because some charges remain in the first capacitor 111 when power is transmitted from the series resonant circuit 110 to a battery module. As described above, when charges remain in the first capacitor 111, since the first capacitor 111 has a charging voltage, power may not be appropriately transmitted from the battery module to the first capacitor 111.

An operation after the time t0+Ts of FIG. 5 will now be described.

The voltage of the first capacitor 111 at the time t0+Ts is Va. As shown in FIG. 5, Va is a value greater than zero. In this state, when the series resonant circuit 110 should be connected to the first or third battery module 21 or 23 for a balancing process, power may not be appropriately transmitted due to charges remaining in the first capacitor 111 because the polarity of the voltage of the first or third battery module 21 or 23 equals the polarity of the voltage of the first capacitor 111. Specifically, assuming that the series resonant circuit 110 is electrically connected to the first or third battery module 21 or 23, since the polarity of the voltage of the first or third battery module 21 or 23 equals the polarity of the voltage of the first capacitor 111, power may not be appropriately transmitted from the first or third battery module 21 or 23 to the series resonant circuit 110. In other words, the voltage charged in the first capacitor 111 may disturb transmission of power from the first or third battery module 21 or 23, the polarity of which equals as the polarity of the first capacitor 111. In this case, the control unit controls the polarity change switch 122 and the transmission switches 141, 142, 143, and 144 to change the polarity of the voltage of the first capacitor 111 in such a manner that power is appropriately transmitted from the first or third battery module 21 or 23 to the series resonant circuit 110.

Figure 10:
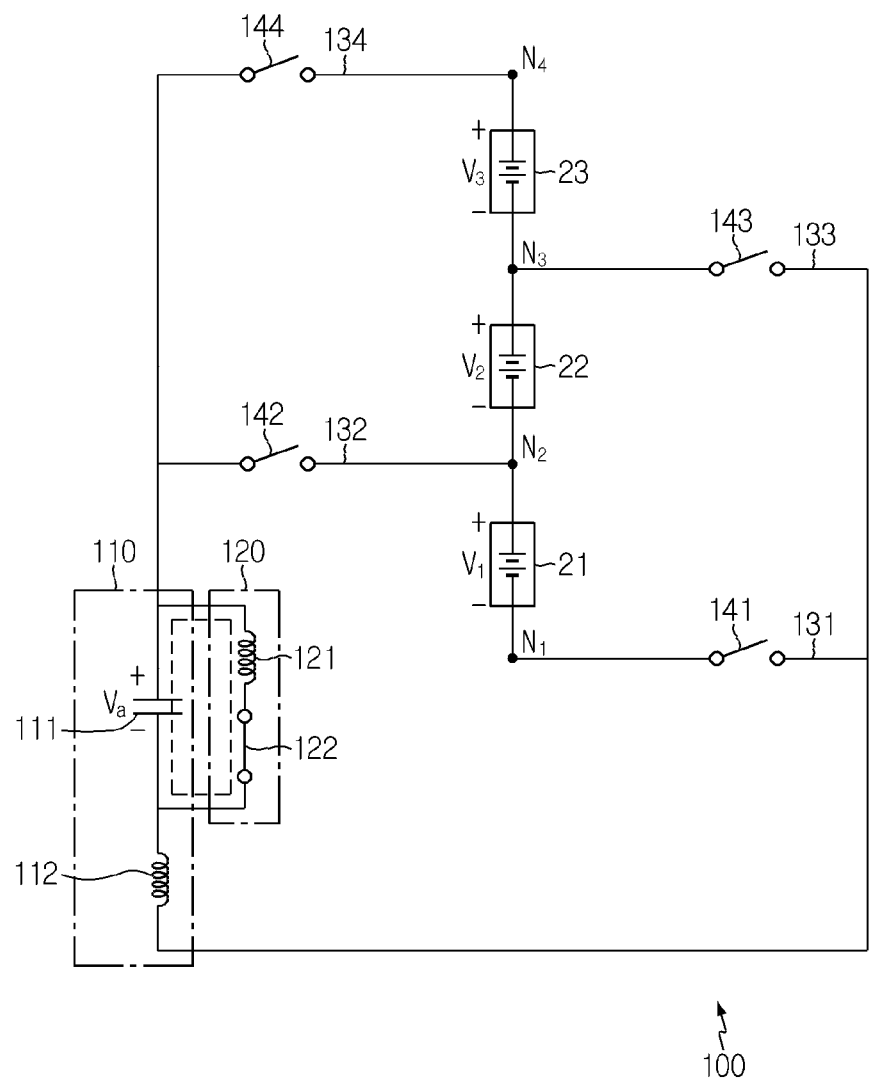
FIG. 10 is a circuit diagram showing a state before the polarity of the voltage of the first capacitor is changed.
Figure 11:
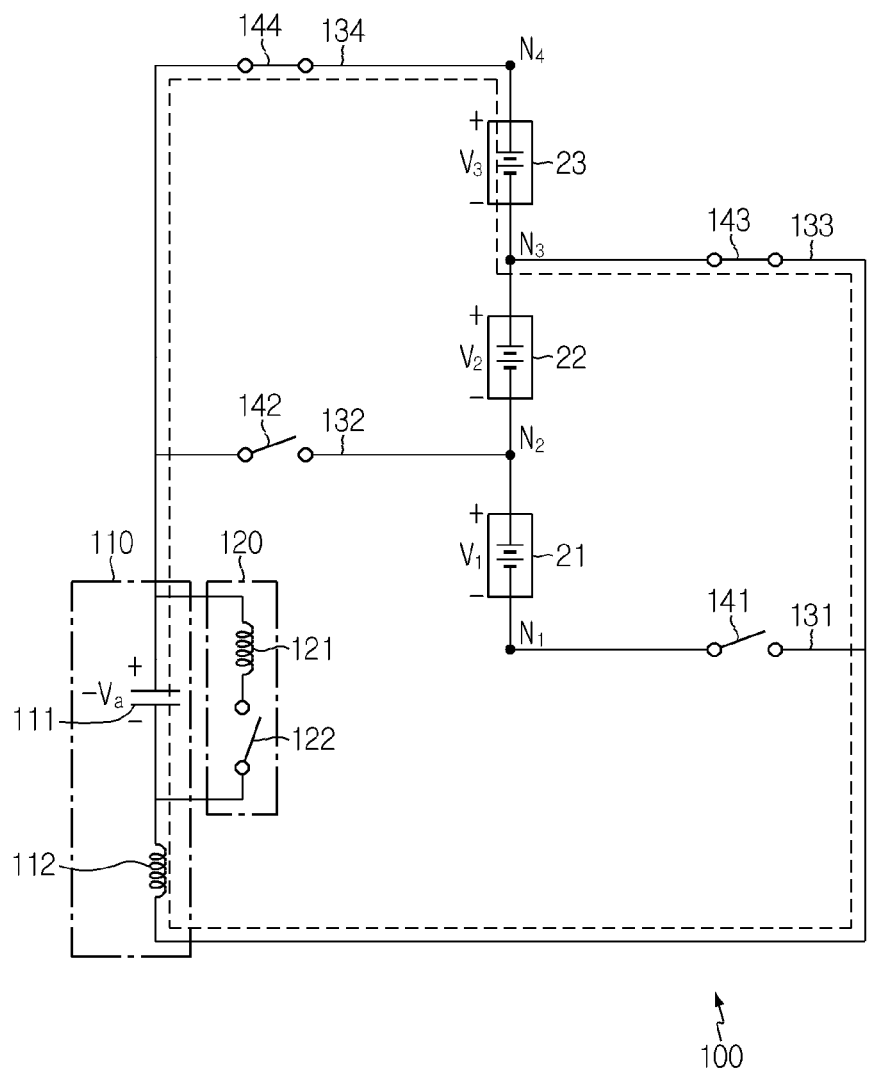
FIG. 11 is a circuit diagram showing a state after the polarity of the voltage of the first capacitor is changed.
Figure 12:
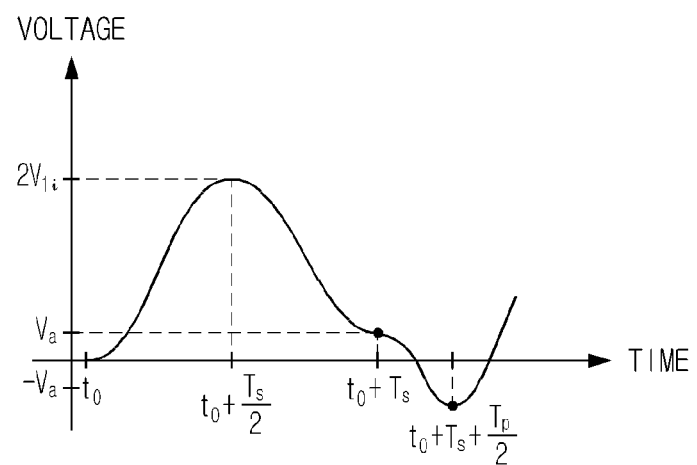
FIG. 12 is a graph showing the voltage of the first capacitor based on time.

FIG. 10 is a circuit diagram showing a state before the polarity of the voltage of the first capacitor 111 is changed, FIG. 11 is a circuit diagram showing a state after the polarity of the voltage of the first capacitor 111 is changed, and FIG. 12 is a graph showing the voltage of the first capacitor 111 based on time.

At the time t0+Ts, as shown in FIG. 10, the control unit controls the polarity change switch 122 to be turned on and controls all of the transmission switches 141, 142, 143, and 144 to be turned off. Since the voltage of the first capacitor 111 at the time t0+Ts is Va as shown in FIG. 5, the control unit controls the voltage of the first capacitor 111 to be −Va at a time t0+Ts+Tp/2 by maintaining the above-described switching state until the time t0+Ts+Tp/2. That is, the control unit changes the polarity of the voltage of the first capacitor 111 in such a manner that the voltage of the first capacitor 111 is changed from Va into −Va. In addition, the control unit controls the polarity change switch 122 and the transmission switches 141, 142, 143, and 144 in such a manner that the series resonant circuit 110 is connected to the first or third battery module 21 or 23 at the time t0+Ts+Tp/2. For example, to transmit power stored in the third battery module 23 to the series resonant circuit 110, as shown in FIG. 11, the control unit controls the two transmission switches 143 and 144 connected to two ends of the third battery module 23 to be turned on, controls the transmission switches 141 and 142 other than the two transmission switches 143 and 144 to be turned off, and controls the polarity change switch 122 to be turned off at the time t0+Ts+Tp/2. As shown in FIG. 11, since the voltage of the first capacitor 111 is polarity-changed into −Va at the time t0+Ts+Tp/2, power may be transmitted from the series resonant circuit 110 to the third battery module 23 after t0+Ts+Tp/2. A change in the voltage of the first capacitor 111 during the above processes, i.e., the process of changing the polarity of the first capacitor 111 and the process of receiving power transmitted from the third battery module 23, is shown in a period after t0+Ts of FIG. 12.

When the series resonant circuit 110 should be connected to the second battery module 22 for a balancing process, although charges remain in the first capacitor 111, power may be appropriately transmitted to and from the second battery module 22 because the polarity of the voltage of the second battery module 22 differs from the polarity of the voltage of the first capacitor 111. Specifically, assuming that the series resonant circuit 110 is electrically connected to the second battery module 22, since the polarity of the voltage of the second battery module 22 differs from the polarity of the voltage of the first capacitor 111, power may be appropriately transmitted from the second battery module 22 to the series resonant circuit 110. In other words, when the polarity of the voltage of the first capacitor Ill differs from the polarity of the voltage of the second battery module 22 which desires to transmit power to the first capacitor 111, the voltage charged in the first capacitor 111 does not disturb transmission of power from the second battery module 22. In this case, the control unit controls the polarity change switch 122 and the transmission switches 141, 142, 143, and 144 to directly connect the series resonant circuit 110 to the second battery module 22 without changing the polarity of the first capacitor 111.

An operation after the time t1+Tp/2+Ts/2 of FIG. 9 will now be described.

The voltage of the first capacitor 111 at the time t1+Tp/2+Ts/2 is −Vb. As shown in FIG. 9, −Vb is a value less than zero. In this state, when the series resonant circuit 110 should be connected to the second battery module 22 for a balancing process, power may not be appropriately transmitted due to charges remaining in the first capacitor 111 because the polarity of the voltage of the second battery module 22 equals the polarity of the voltage of the first capacitor 111. Specifically, assuming that the series resonant circuit 110 is electrically connected to the second battery module 22, since the polarity of the voltage of the second battery module 22 equals the polarity of the voltage of the first capacitor 111, power may not be appropriately transmitted from the second battery module 22 to the series resonant circuit 110. In this case, the control unit controls the polarity change switch 122 and the transmission switches 141, 142, 143, and 144 to change the polarity of the voltage of the first capacitor 111 in such a manner that power is appropriately transmitted from the second battery module 22 to the series resonant circuit 110.

Figure 13:
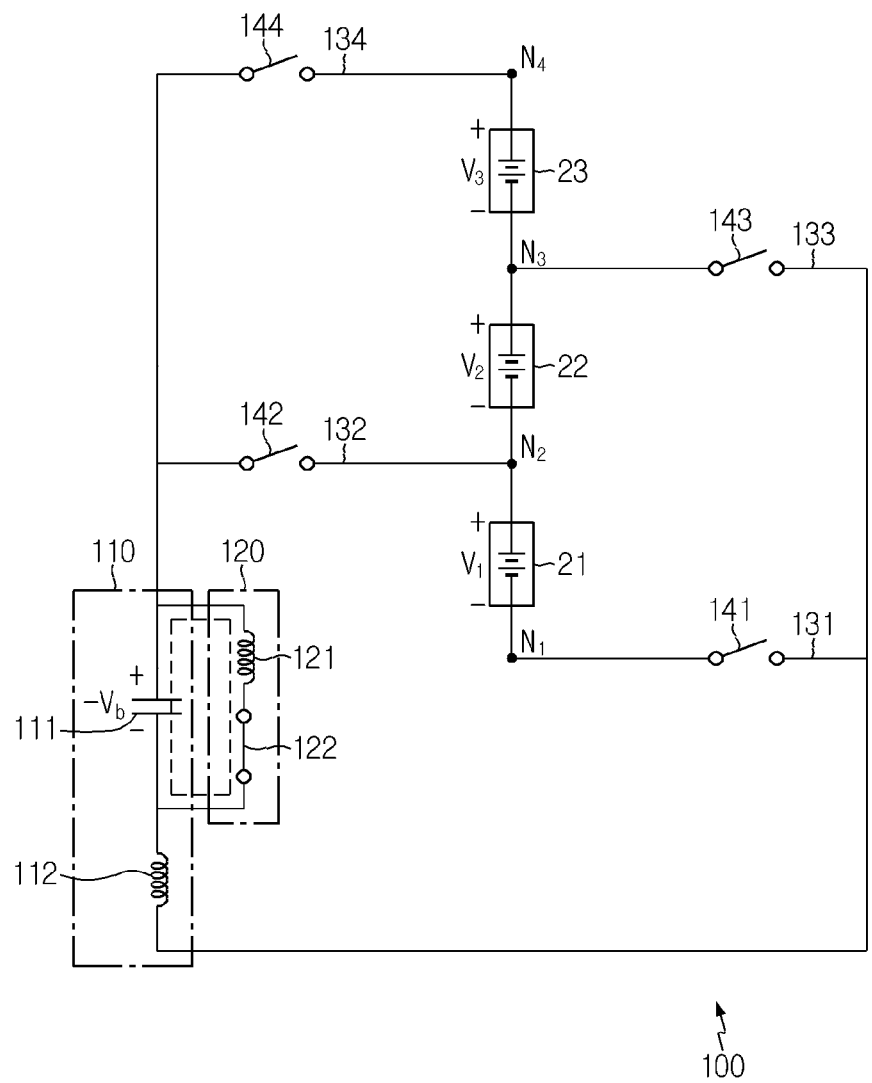
FIG. 13 is a circuit diagram showing a state before the polarity of the voltage of the first capacitor is changed.
Figure 14:
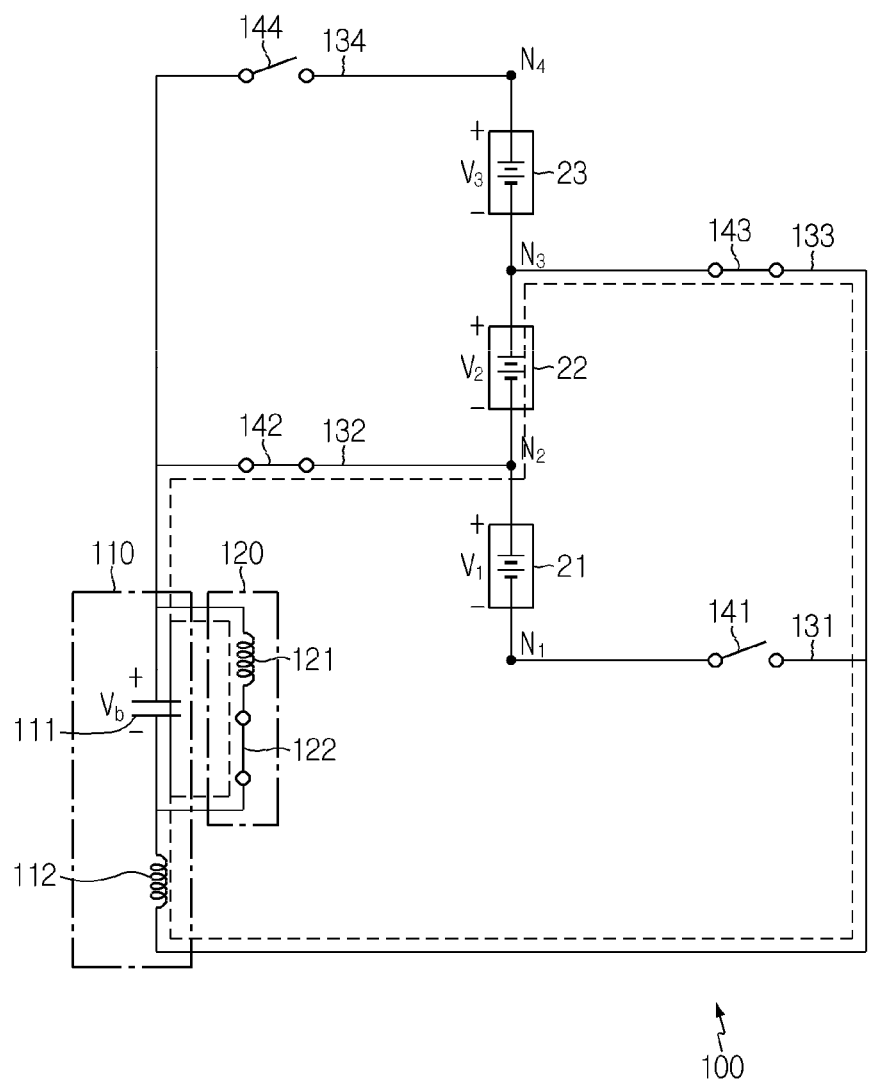
FIG. 14 is a circuit diagram showing a state after the polarity of the voltage of the first capacitor is changed.
Figure 15:
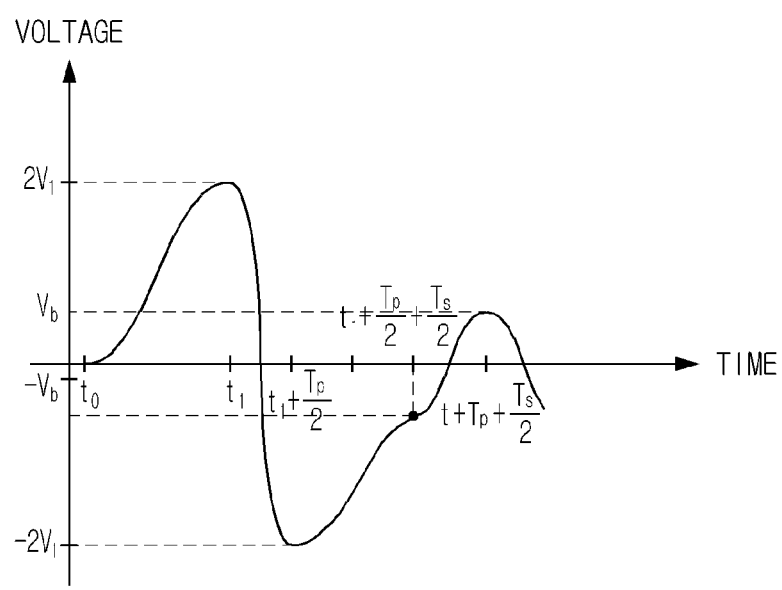
FIG. 15 is a graph showing the voltage of the first capacitor based on time.

FIG. 13 is a circuit diagram showing a state before the polarity of the voltage of the first capacitor 111 is changed, FIG. 14 is a circuit diagram showing a state after the polarity of the voltage of the first capacitor 111 is changed, and FIG. 15 is a graph showing the voltage of the first capacitor 111 based on time.

At the time t1+Tp/2+Ts/2, as shown in FIG. 13, the control unit controls the polarity change switch 122 to be turned on and controls all of the transmission switches 141, 142, 143, and 144 to be turned off. Since the voltage of the first capacitor 111 at the time t1+Tp/2+Ts/2 is −Vb as shown in FIG. 13, the control unit controls the voltage of the first capacitor 111 to be Vb at a time t1+Tp+Ts/2 by maintaining the above-described switching state until the time t1+Tp/2+Ts/2+Tp/2(=t1+Tp+Ts/2). That is, the control unit changes the polarity of the voltage of the first capacitor 111 in such a manner that the voltage of the first capacitor 111 is changed from −Vb into Vb. In addition, the control unit controls the polarity change switch 122 and the transmission switches 141, 142, 143, and 144 in such a manner that the series resonant circuit 110 is connected to the second battery module 22 at the time t1+Tp+Ts/2. That is, as shown in FIG. 14, the control unit controls the two transmission switches 142 and 143 connected to two ends of the second battery module 22 to be turned on, controls the transmission switches 141 and 144 other than the two transmission switches 142 and 143 to be turned off, and controls the polarity change switch 122 to be turned off at the time t1+Tp+Ts/2. As shown in FIG. 14, since the voltage of the first capacitor 111 is polarity-changed into Vb at the time t1+Tp+Ts/2, power may be transmitted from the series resonant circuit 110 to the second battery module 22 after t1+Tp+Ts/2. A change in the voltage of the first capacitor 111 during the above processes, i.e., the process of changing the polarity of the first capacitor 111 and the process of receiving power transmitted from the second battery module 22, is shown in a period after t1+Tp/2+Ts/2 of FIG. 15.

When the series resonant circuit 110 should be connected to the first or third battery module 21 or 23 for a balancing process, although charges remain in the first capacitor 111, power may be appropriately transmitted to and from the first or third battery module 21 or 23 because the polarity of the voltages of the first and third battery modules 21 and 23 differs from the polarity of the voltage of the first capacitor 111. Specifically, assuming that the series resonant circuit 110 is electrically connected to each of the first and third battery modules 21 and 23, since the polarity of the voltage of the first battery module 21 differs from the polarity of the voltage of the first capacitor 111 and the polarity of the voltage of the third battery module 23 differs from the polarity of the voltage of the first capacitor 111, power may be appropriately transmitted from the first or third battery module 21 or 23 to the series resonant circuit 110 without changing the polarity of the first capacitor 111. In this case, the control unit controls the polarity change switch 122 and the transmission switches 141, 142, 143, and 144 to directly connect the series resonant circuit 110 to the first or third battery module 21 or 23 without changing the polarity of the first capacitor 111.

Although three battery modules are used in the above description, the battery stack balancing apparatus 100 according to an embodiment of the present disclosure is not limited by the number of battery modules. That is, the above description may be equally applied to a larger number of battery modules. Although the number of battery modules is increased, the battery stack balancing apparatus 100 will be easily implemented by one of ordinary skill in the art based on the description disclosed in this specification.

In addition, although power is transmitted between the series resonant circuit 110 and a single battery module in the above description, the battery stack balancing apparatus 100 according to an embodiment of the present disclosure is not limited thereto. That is, in the above-described example, power may be transmitted to or from the series resonant circuit 110 due to electrical connection between an odd number of adjacent battery modules and the series resonant circuit 110. For example, assuming that the battery stack 10 includes first to seventh battery modules, the control unit may control the first to third battery modules 21, 22, and 23 to be electrically connected to the series resonant circuit 110 in such a manner that power stored in the first to third battery modules 21, 22, and 23 is transmitted to the series resonant circuit 110. In addition, the control unit may control the fourth to sixth battery modules to be electrically connected to the series resonant circuit 110 in such a manner that power stored in the series resonant circuit 110 is transmitted to the fourth to sixth battery modules. Alternatively, the control unit may control the fifth to seventh battery modules to be electrically connected to the series resonant circuit 110 in such a manner that power stored in the series resonant circuit 110 is transmitted to the fifth to seventh battery modules, or the control unit may control the series resonant circuit 110 to transmit power to other three adjacent battery modules. As necessary, the control unit may change the polarity of the voltage of the first capacitor 111 by using the polarity change circuit 120 when power is transmitted between battery modules and the series resonant circuit 110.

Figure 16:
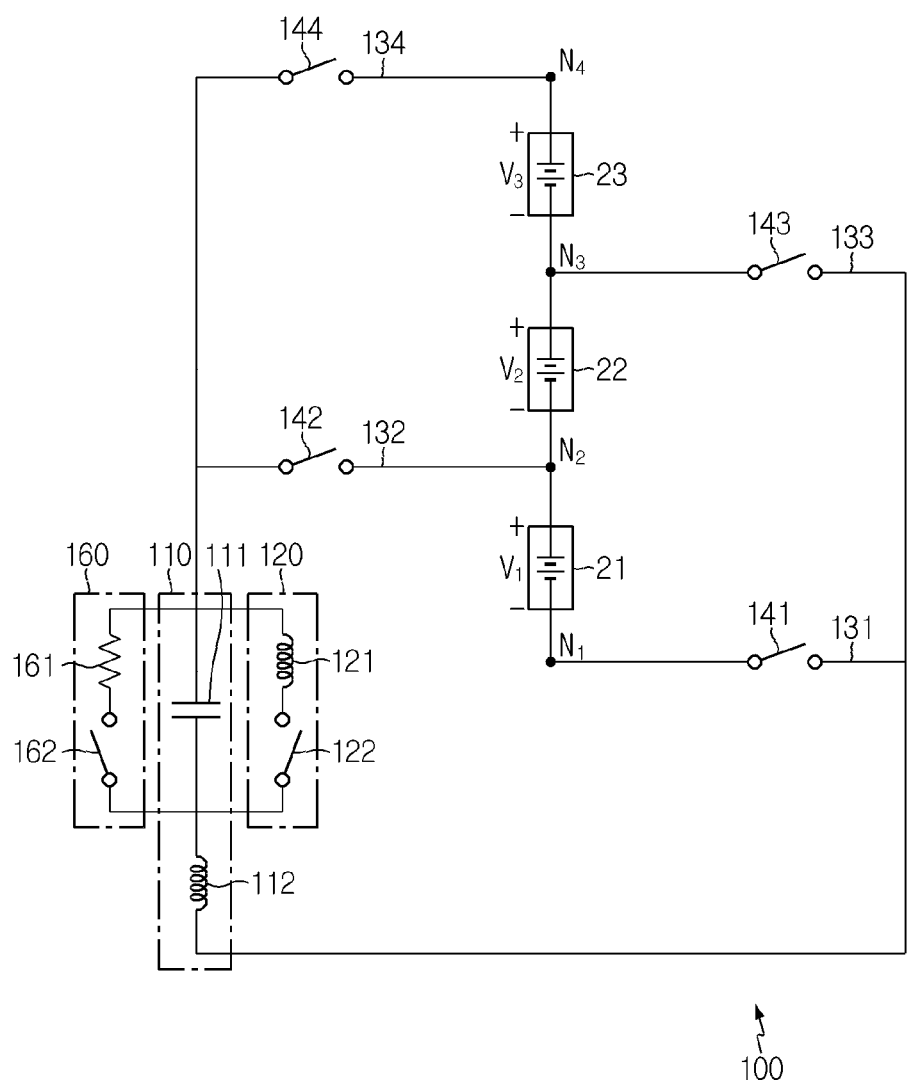
FIG. 16 is a circuit diagram showing that the battery stack balancing apparatus according to another embodiment of the present disclosure is connected to the battery stack.

FIG. 16 is a circuit diagram showing that the battery stack balancing apparatus 100 according to another embodiment of the present disclosure is connected to the battery stack 10.

Referring to FIG. 16, compared to the battery stack balancing apparatus 100 illustrated in FIG. 1, etc., the battery stack balancing apparatus 100 according to another embodiment of the present disclosure further includes a consumption circuit 160 connected to the first capacitor 111 in parallel. Accordingly, the above descriptions may be equally applied to the battery stack balancing apparatus 100 according to another embodiment of the present disclosure as long as there is no contradiction therebetween. Therefore, repeated descriptions of the same components are not provided herein.

The consumption circuit 160 includes a resistor 161 and a switch 162 connected to the resistor 161 in series. In this specification, the resistor 161 is referred to as a consumption resistor 161, and the switch 162 connected to the resistor 161 in series is referred to as a consumption switch 162. The consumption switch 162 may be turned on or off based on a control signal of the control unit (not shown), and may be implemented as one of a variety of switching devices. The consumption circuit 160 may be another means for solving a problem in that the first capacitor 111 is not efficiently charged due to charges remaining in the first capacitor 111 in a balancing process.

Referring back to FIGS. 5 and 9, it is shown that the voltage of the first capacitor 111 at the time t0+Ts of FIG. 5 is not zero and the voltage of the first capacitor 111 at the time t1+Tp/2+Ts/2 of FIG. 9 is not zero because some charges remain in the first capacitor 111 when power is transmitted from the series resonant circuit 110 to a battery module. As described above, when charges remain in the first capacitor 111, since the first capacitor 111 has a voltage difference, power may not be appropriately transmitted from the battery module to the first capacitor 111. Accordingly, the battery stack balancing apparatus 100 according to another embodiment of the present disclosure may consume all charges remaining in the first capacitor 111 by using the consumption circuit 160. Specifically, before power is transmitted from the battery module to the series resonant circuit 110, the control unit consumes all charges remaining in the first capacitor 111 by turning on the consumption switch 162 and turning off all of the transmission switches 141, 142, 143, and 144. In this case, the polarity change switch 122 may be turned on or off but, desirably, the polarity change switch 122 may be turned off. The control unit maintains the turned on state of the consumption switch 162 and the turned off state of all of the transmission switches 141, 142, 143, and 144 until a reference time has passed. In this case, the reference time may be set to a time sufficient to consume all charges remaining in the first capacitor 111.

According to another aspect of the present disclosure, the above-described battery stack balancing apparatus 100 may be included in a battery pack. That is, a battery pack according to another aspect of the present disclosure may include the above-described battery stack balancing apparatus 100. For example, the battery pack may include a battery management apparatus, and the battery management apparatus may include the battery stack balancing apparatus 100 as a component thereof.

The battery stack balancing apparatus 100 may be included in a vehicle. That is, a vehicle according to another aspect of the present disclosure may include the above-described battery stack balancing apparatus 100. For example, the vehicle may include a battery pack, and the battery pack may include the battery stack balancing apparatus 100. Alternatively, the vehicle may include a vehicle control apparatus, and the vehicle control apparatus may include the battery stack balancing apparatus 100. Herein, the vehicle may include not only an electric vehicle or a hybrid vehicle, which uses electric energy as a power source, but also a vehicle including electric components which receive power based on electric energy.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Features described in individual embodiments of the present disclosure can also be integrally implemented in a single embodiment. Conversely, various features described in a single embodiment of the present disclosure can also be individually implemented in various embodiments or in any suitable subcombination thereof.

What is claimed is:

1. A battery stack balancing apparatus for balancing a battery stack comprising a plurality of battery modules connected to each other in series, the apparatus comprising:
    a series resonant circuit comprising a first capacitor and a first inductor connected to the first capacitor in series;
    a polarity change circuit comprising a second inductor and a polarity change switch connected to the second inductor in series so as to be selectively turned on or off, wherein an entirety of the polarity change circuit is connected to the first capacitor in parallel;
    a plurality of transmission lines, each transmission line having a first end electrically connected to one of a plurality of nodes, including a first transmission line electrically connected to a first node at a low-potential end of the battery stack, a second transmission line electrically connected to a second node at a high-potential end of the battery stack, and at least a third transmission line electrically connected between the plurality of battery modules connected to each other in series, and each transmission line having a second end connected to the series resonant circuit;
    a plurality of transmission switches, including a first transmission switch provided on the first transmission line, a second transmission switch provided on the second transmission line, and a third transmission switch provided on the third transmission line, wherein each transmission switch is configured to be selectively turned on or off; and
    a control unit configured to:
    control the plurality of transmission switches and the polarity change switch, and
    control the polarity change circuit and each of the transmission switches to perform cell balancing of the plurality of battery modules.

2. The battery stack balancing apparatus of claim 1, further comprising a fourth transmission line directly electrically connected between the plurality of battery modules connected to each other in series and a fourth transmission switch provided on the fourth transmission line.

3. The battery stack balancing apparatus of claim 2, wherein the control unit is configured to selectively control each transmission switch to perform zero current switching or zero voltage switching in accordance with a half period of a resonance period of the series resonant circuit by opening the first and third transmission switches and closing the second and fourth transmission switches.

4. The battery stack balancing apparatus of claim 2, wherein the control unit controls the polarity change switch in such a manner that zero current switching or zero voltage switching is performed in accordance with a half period of a resonance period of a parallel resonant circuit formed by the first capacitor and the second inductor by turning on the polarity change switch and turning off the first, second, third and fourth transmission switches.

5. The battery stack balancing apparatus of claim 1, wherein the control unit is configured to control the polarity change switch and the plurality of transmission switches by comparing a polarity of a voltage of at least one battery module among the plurality of battery modules for supplying power to the series resonant circuit, to a polarity of a voltage charged in the first capacitor.

6. The battery stack balancing apparatus of claim 5, wherein the control unit is configured to control the polarity change switch to be turned on and control all of the plurality of transmission switches to be turned off, when the polarity of the voltage of the at least one battery module for supplying power to the series resonant circuit equals the polarity of the voltage charged in the first capacitor.

7. The battery stack balancing apparatus of claim 2, wherein the control unit is configured to control the polarity change switch and the plurality of transmission switches by comparing a polarity of a voltage of at least one battery module among the plurality of battery modules for receiving power supplied from the series resonant circuit, to a polarity of a voltage charged in the first capacitor.

8. The battery stack balancing apparatus of claim 7, wherein the control unit is configured to control the polarity change switch to be turned off, control the first and third transmission switches connected to two ends of the at least one battery module for receiving power supplied from the series resonant circuit, to be turned on, and control the second and fourth transmission switches to be turned off, when the polarity of the voltage of the at least one battery module for receiving power supplied from the series resonant circuit equals the polarity of the voltage charged in the first capacitor.

9. The battery stack balancing apparatus of claim 7, wherein the control unit is configured to control the polarity change switch to be turned on and control all of the transmission switches to be turned off, when the polarity of the voltage of the at least one battery module for receiving power supplied from the series resonant circuit differs from the polarity of the voltage charged in the first capacitor.

10. The battery stack balancing apparatus of claim 1, wherein each of the battery modules is a unit battery cell or an assembly of two or more battery cells.

11. A battery pack comprising the battery stack balancing apparatus of claim 1.

12. An electric vehicle comprising the battery stack balancing apparatus of claim 1.

13. The battery stack balancing apparatus of claim 1, wherein the second end of the first transmission line is directly connected to the first inductor.

14. The battery stack balancing apparatus of claim 13, wherein the second end of the second transmission line is directly connected to the first capacitor.

15. The battery stack balancing apparatus of claim 14, wherein the second end of the third transmission line is directly connected to one of the first inductor and the first capacitor.

16. The battery stack balancing apparatus of claim 2, wherein the second end of the first transmission line is directly connected to the first inductor.

17. The battery stack balancing apparatus of claim 16, wherein the second end of the second transmission line is directly connected to the first capacitor.

18. The battery stack balancing apparatus of claim 17, wherein the second end of the third transmission line is directly connected to the first inductor, and
wherein the second end of the fourth transmission line is directly connected to the first capacitor.

19. The battery stack balancing apparatus of claim 1, further comprising a consumption circuit connected to the first capacitor in parallel,
wherein the consumption circuit includes a consumption resistor and a consumption switch connected in series, and
wherein the controller is further configured to control the consumption switch.

* * * * *